US011993483B2

(12) United States Patent
Gireddy

(10) Patent No.: US 11,993,483 B2
(45) Date of Patent: May 28, 2024

(54) E-CALL REGISTRATION FOR ELEVATOR

(71) Applicant: OTIS ELEVATOR COMPANY, Farmington, CT (US)

(72) Inventor: Jayapal Reddy Gireddy, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1442 days.

(21) Appl. No.: 16/386,362

(22) Filed: Apr. 17, 2019

(65) Prior Publication Data

US 2019/0322483 A1 Oct. 24, 2019

(30) Foreign Application Priority Data

Apr. 19, 2018 (IN) ............................ 201811014894

(51) Int. Cl.
*B66B 1/46* (2006.01)
*B66B 1/28* (2006.01)
*B66B 1/34* (2006.01)

(52) U.S. Cl.
CPC ................ *B66B 1/468* (2013.01); *B66B 1/28* (2013.01); *B66B 1/3461* (2013.01); *B66B 2201/101* (2013.01); *B66B 2201/4607* (2013.01); *B66B 2201/4653* (2013.01)

(58) Field of Classification Search
CPC ......... B66B 1/468; B66B 1/28; B66B 1/3461; B66B 2201/101; B66B 2201/4607; B66B 2201/4653; B66B 2201/4684; B66B 1/14; B66B 1/3423; B66B 1/3446; B66B 5/0018
See application file for complete search history.

(56) References Cited

U.S. PATENT DOCUMENTS

| | | | |
|---|---|---|---|
| 3,556,703 | A | 1/1971 | Florjancic |
| 5,984,051 | A | 11/1999 | Morgan et al. |
| 6,109,396 | A | 8/2000 | Sirag et al. |
| 6,397,976 | B1 | 6/2002 | Hale et al. |
| 7,552,800 | B2 | 6/2009 | Puskala et al. |
| 10,513,417 | B2 | 12/2019 | Zhao et al. |

(Continued)

FOREIGN PATENT DOCUMENTS

| | | | |
|---|---|---|---|
| CN | 1976855 | A | 6/2007 |
| CN | 101378982 | A | 3/2009 |

(Continued)

OTHER PUBLICATIONS

CN Office Action; dated Aug. 16, 2021; Application No. 201910315712.5; Filed: Apr. 18, 2019; 9 pages.

(Continued)

*Primary Examiner* — Jeffrey Donels
(74) *Attorney, Agent, or Firm* — CANTOR COLBURN LLP

(57) ABSTRACT

An elevator system is provided. Aspects includes at least one elevator car, a plurality of sensors, a controller coupled to a memory, the controller configured to receive a call request for an elevator car from a user device. An identifier is transmitted to the user device and to the plurality of sensors. A location of the user device is determined based at least in part on at least one sensor in the plurality of sensors detecting the identifier on the user device. And the at least one elevator car is operated based on the location of the user device.

13 Claims, 4 Drawing Sheets

(56) References Cited

U.S. PATENT DOCUMENTS

| | | | | |
|---|---|---|---|---|
| 2007/0151809 | A1* | 7/2007 | Tyni | B66B 3/00 187/391 |
| 2008/0236956 | A1* | 10/2008 | Finschi | B66B 1/468 187/382 |
| 2009/0022131 | A1* | 1/2009 | Rusanen | B66B 1/468 370/338 |
| 2015/0181384 | A1 | 6/2015 | Mayor et al. | |
| 2016/0031676 | A1 | 2/2016 | Haipus | |
| 2016/0207735 | A1 | 7/2016 | Elomaa et al. | |
| 2016/0311647 | A1* | 10/2016 | Peterson | B66B 5/0012 |
| 2017/0010099 | A1* | 1/2017 | Simcik | G01C 21/206 |
| 2017/0013409 | A1 | 1/2017 | Cerchio et al. | |
| 2017/0057781 | A1* | 3/2017 | DePaola | B66B 1/468 |
| 2018/0052519 | A1 | 2/2018 | Amores-Llopis et al. | |
| 2019/0023528 | A1* | 1/2019 | Franco | H04W 4/029 |

FOREIGN PATENT DOCUMENTS

| | | | | |
|---|---|---|---|---|
| CN | 102107804 | A | 6/2011 | |
| CN | 103261068 | A | 8/2013 | |
| CN | 204980676 | U | 1/2016 | |
| CN | 105358461 | A | 2/2016 | |
| CN | 106144804 | A | 11/2016 | |
| CN | 106315316 | A | 1/2017 | |
| CN | 107771159 | A | 3/2018 | |
| CN | 107848737 | A | 3/2018 | |
| EP | 1189830 | B1 | 10/2003 | |
| EP | 1943175 | | 8/2011 | |
| EP | 3073704 | A1 | 9/2016 | |
| JP | 2007145536 | A | 6/2007 | |
| KR | 20160084996 | A | 7/2016 | |
| WO | 2013033879 | A1 | 3/2013 | |
| WO | WO-2015015049 | A1 * | 2/2015 | B66B 1/468 |
| WO | WO-2015070926 | A1 * | 5/2015 | B66B 1/2458 |
| WO | 2017175019 | A1 | 10/2017 | |

OTHER PUBLICATIONS

Gimbal, [online]; [retreived on Apr. 17, 2019]; retreived from the Internet https://gimbal.com/beacons/, “Proximity Beacons”.

CN Office Action; dated Mar. 17, 2021; Application No. 201910315712.5; Filed: Apr. 18, 2019; 12 pages.

EP Search Report; dated Sep. 23, 2019; Application No. 19169796.0; Filed: Apr. 17, 2019; 9 pages.

CN Notice of Allowance; dated Jan. 30, 2022; CN Application No. 201910315712.5; Filed: Apr. 18, 2019; 7 pages.

* cited by examiner

E-CALL REGISTRATION FOR ELEVATOR

CROSS-REFERENCE TO RELATED APPLICATIONS

This application claims the benefit of Indian provisional application no. 201811014894 filed Apr. 19, 2018, which is incorporated herein by reference in its entirety.

BACKGROUND

The subject matter disclosed herein generally relates to elevator systems and, more particularly, to e-call registration for an elevator system.

Elevator cars in an elevator system typically respond to an elevator call when a passenger presses the physical call button in an elevator lobby. Recently, elevator systems have incorporated elevator calls from a passenger in electronic form. For example, a passenger can enter a call for an elevator car at a computer terminal or from a mobile device, such as a cell phone. An electronic application installed on a passenger's mobile device can send a call signal to an elevator controller to initiate an elevator call. However, these electronic calls can be problematic when a passenger registers the electronic call but then changes their mind and does not enter the elevator car. These so called ghost calls can become a nuisance in high-rise buildings.

BRIEF DESCRIPTION

According to one embodiment, an elevator system is provided. The elevator system includes at least one elevator car, a plurality of sensors, a controller coupled to a memory, the controller configured to receive a call request for an elevator car from a user device. An identifier is transmitted to the user. A location of the user device is determined based at least in part on at least one sensor in the plurality of sensors detecting the identifier on the user device. And the at least one elevator car is operated based on the location of the user device.

In addition to one or more of the features described above, or as an alternative, further embodiments of the elevator system may include that the controller is further configured to transmit a confirmation to the user device.

In addition to one or more of the features described above, or as an alternative, further embodiments of the elevator system may include that the confirmation comprises an elevator car identifier.

In addition to one or more of the features described above, or as an alternative, further embodiments of the elevator system may include that the confirmation comprises a time window for a user of the user device to travel to a first region.

In addition to one or more of the features described above, or as an alternative, further embodiments of the elevator system may include that the controller is further configured to cancel the call request based at least in part on the user device failing to travel to the first region within the time window and transmit a cancellation to the user device.

In addition to one or more of the features described above, or as an alternative, further embodiments of the elevator system may include that the controller is further configured to based at least in part on the user device travelling to the first region within the time window, identify a second region for the user device to travel to within a second time window and determine that the user device travels to the second region within the second time window.

In addition to one or more of the features described above, or as an alternative, further embodiments of the elevator system may include that the controller is further configured to cancel the call request based at least in part on the user device failing to travel to the second region within the second time window and transmit a cancellation to the user device.

According to one embodiment, a system is provided. The system includes a plurality of sensors, wherein the plurality of sensors are positioned at one or more locations associated with an elevator system and a processor coupled to a memory, the processor configured to receive a call request for an elevator car from a user device. An identifier is transmitted to the user. A location of the user device is determined based at least in part on at least one sensor in the plurality of sensors detecting the identifier on the user device. And the call request is transmitted to an elevator controller.

In addition to one or more of the features described above, or as an alternative, further embodiments of the system may include that the processor is further configured to transmit a confirmation to the user device.

In addition to one or more of the features described above, or as an alternative, further embodiments of the system may include that the confirmation comprises an elevator car identifier.

In addition to one or more of the features described above, or as an alternative, further embodiments of the system may include that the confirmation comprises a time window for a user of the user device to travel to a first region.

In addition to one or more of the features described above, or as an alternative, further embodiments of the system may include that the processor is further configured to transmit a cancellation of the call request to the elevator controller based at least in part on the user device failing to travel to the first region within the time window and transmit a cancellation to the user device.

In addition to one or more of the features described above, or as an alternative, further embodiments of the system may include that the processor is further configured to based at least in part on the user device travelling to the first region within the time window, identify a second region for the user device to travel to within a second time window and determine that the user device travels to the second region within the second time window.

In addition to one or more of the features described above, or as an alternative, further embodiments of the system may include that the processor is further configured to transmit a cancellation of the call request to the elevator controller based at least in part on the user device failing to travel to the second region within the second time window and transmit a cancellation to the user device.

According to one embodiment, a method is provided. The method includes receiving, by the controller, a call request for an elevator car from a user device. A location of the user device is determined based at least in part on at least one sensor in the plurality of sensors detecting the identifier on the user device. And the at least one elevator car is operated based on the location of the user device.

In addition to one or more of the features described above, or as an alternative, further embodiments of the method may include transmitting, by the controller, a confirmation to the user device.

In addition to one or more of the features described above, or as an alternative, further embodiments of the method may include that the confirmation comprises an elevator car identifier.

In addition to one or more of the features described above, or as an alternative, further embodiments of the method may include that the confirmation comprises a time window for a user of the user device to travel to a first region.

In addition to one or more of the features described above, or as an alternative, further embodiments of the method may include transmitting a cancellation of the call request to the elevator controller based at least in part on the user device failing to travel to the first region within the time window and transmitting a cancellation to the user device.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
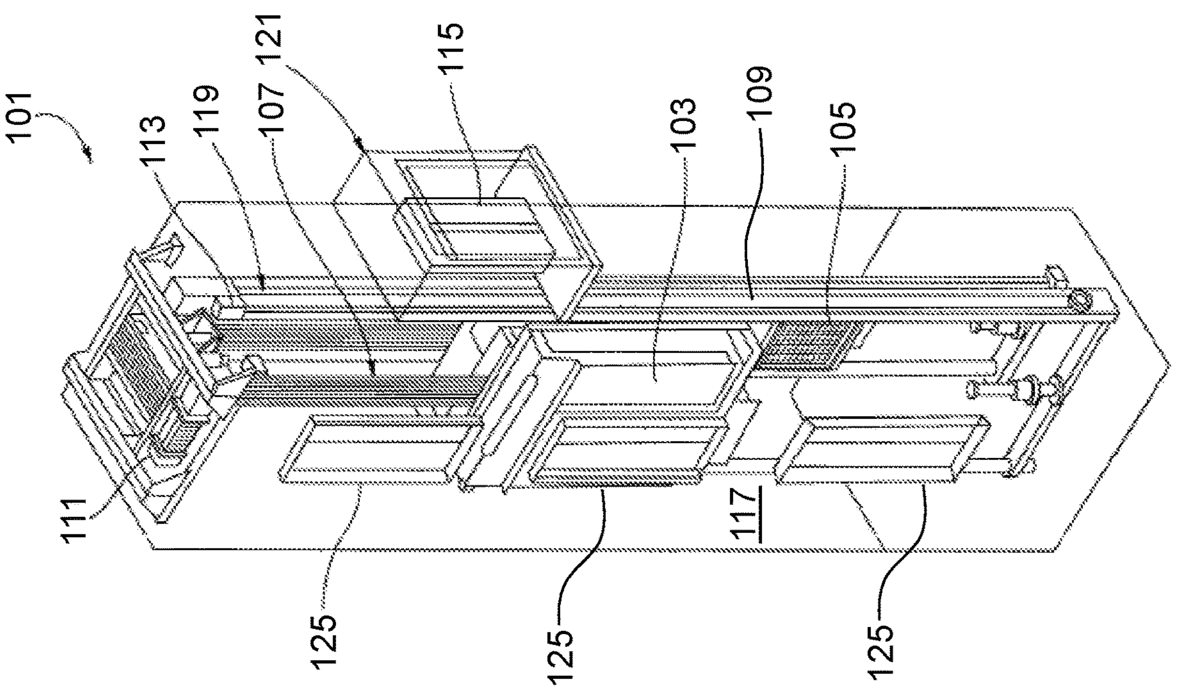
FIG. 1 is a schematic illustration of an elevator system that may employ various embodiments of the disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and/or ropeless elevators, may employ embodiments of the present disclosure. FIG. 1 is merely a non-limiting example presented for illustrative and explanatory purposes.

Figure 2:
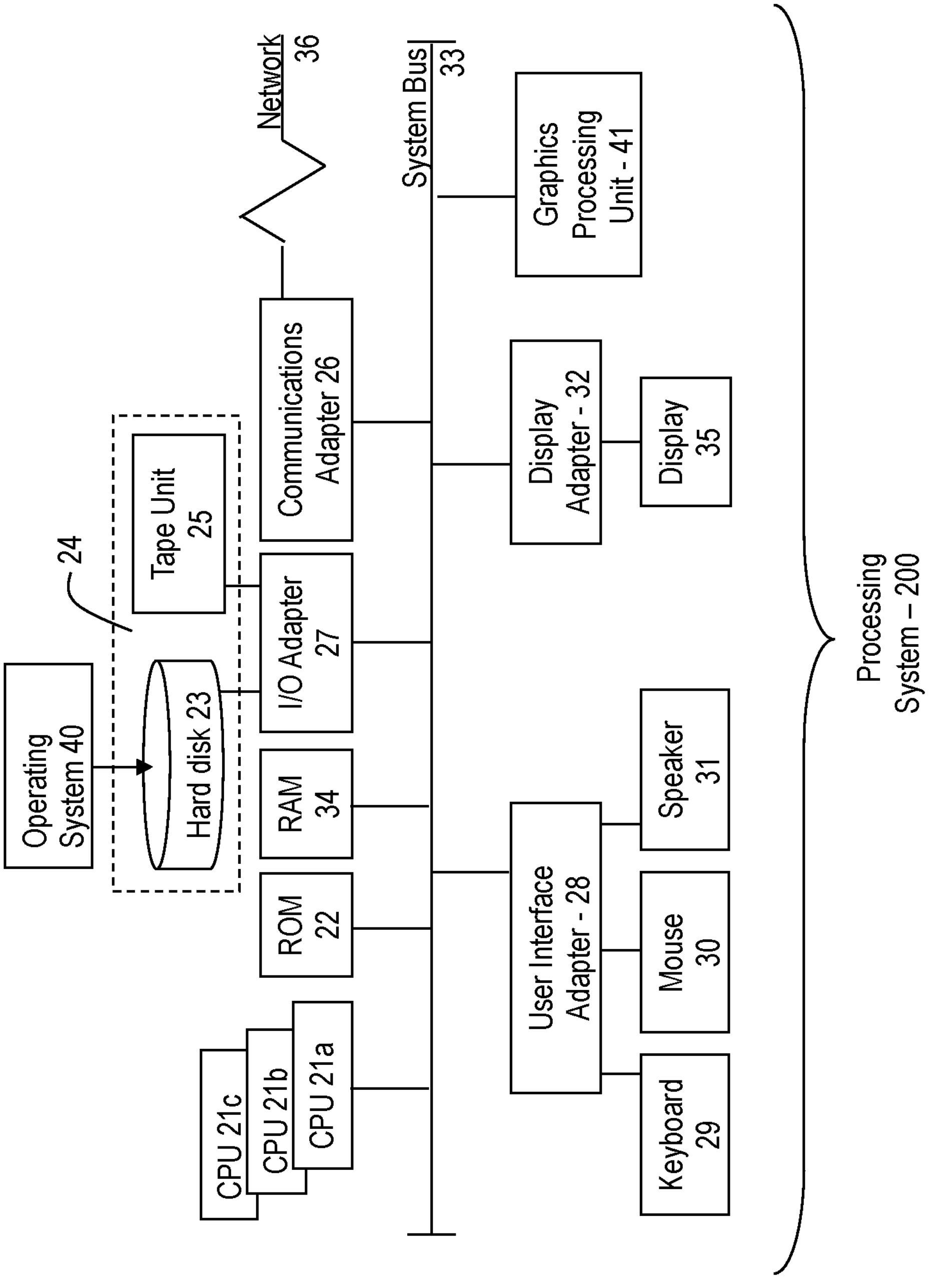
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21*a*, 21*b*, 21*c*, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

Turning now to an overview of technologies that are more specifically relevant to aspects of the disclosure, elevator systems sometimes employ an electronic call (eCall) system that allows passengers to register elevator calls through their mobile user device. However, the elevator system does not have a way to verify a location of the potential passenger when the eCall is made. Because a passenger is utilizing a mobile user device to make the eCall, the eCall can be made from any location, even outside a building. Typically, an eCall is registered with the elevator system and an elevator car is dispatched to the location specified in the eCall. However, a potential passenger can change his or her mind or they might be distracted and not reach the elevator car in time to board the elevator car. For example, a passenger can register an eCall while in the parking deck of a building, but as the passenger is traversing the lobby of the building towards the elevator bank, the passenger may run into a colleague and talk with them for a while. The elevator car is dispatched and no passenger is there to board the elevator car. These are known, sometimes, as “ghost” calls. These ghost calls can cause strain on elevator systems through additional mechanical issues, additional power consumption, and additional load on an elevator controller.

Turning now to an overview of the aspects of the disclosure, one or more embodiments address the above-described shortcomings of the prior art by providing an electronic call registration system utilizing sensors. In one or more embodiments, the eCall system manages call registration by confirming the location of a passenger in a building or structure before dispatching an elevator car for the passenger.

Figure 3:
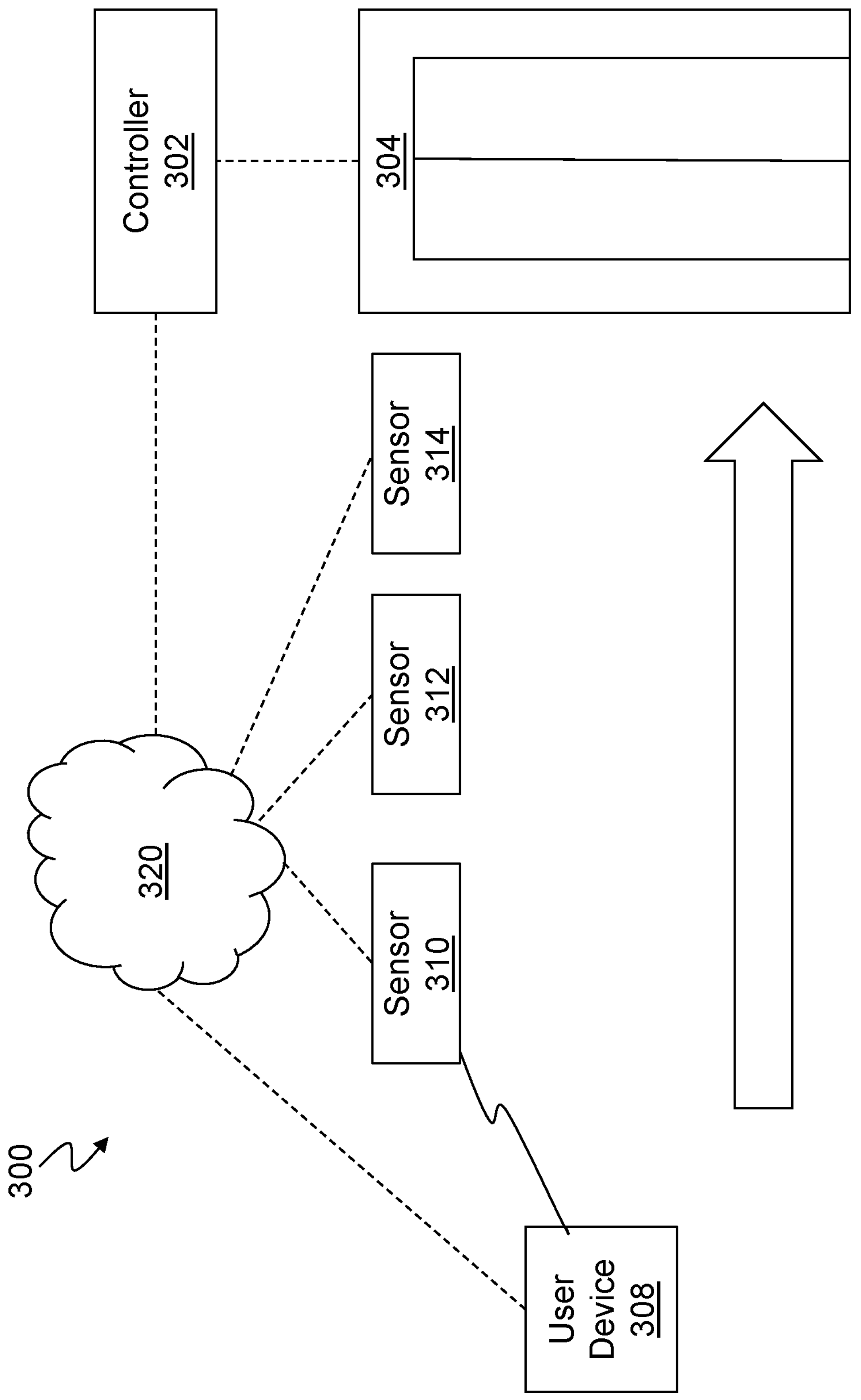
FIG. 3 depicts a block diagram of a system for electronic call registration in an elevator system according to one or more embodiments of the disclosure.

Turning now to a more detailed description of aspects of the present disclosure, FIG. 3 depicts a system 300 for e-Call registration in an elevator system. The system 300 includes an elevator car 304, a plurality of sensor(s) 310, 312, 314 associated with the elevator car 304. The system 300 also includes a controller 302, a network 320, and a user device 308.

In one or more embodiments, the controller 302 and sensors 310, 312, 314 can be implemented on the processing system 200 found in FIG. 2. Additionally, a cloud computing system can be in wired or wireless electronic communication with one or all of the elements of the system 300. Cloud computing can supplement, support or replace some or all of the functionality of the elements of the system 300. Additionally, some or all of the functionality of the elements of system 300 can be implemented as a node of a cloud computing system. A cloud computing node is only one example of a suitable cloud computing node and is not intended to suggest any limitation as to the scope of use or functionality of embodiments described herein.

In one or more embodiments, the controller 302 operates the elevator car 304 based on the location of a passenger. The passenger’s location is determined based on the detection of the passenger’s user device 308 by the plurality of sensors 310, 312, 314. A passenger can send an eCall request to the controller 302 through an application on the passenger’s user device 308. The user device 308 can be any type of mobile device such as a smart phone, smart watch, or tablet. The application can send the eCall request through a cellular or wireless internet connection of the user device 308 to the network 320 and transmit to the controller 302. Responsive to receiving the eCall request, the controller 302 can generate an identifier and transmit the identifier through the network 320 to the application on the user device 308 for storage. The identifier can be any type of identifier including for example a universally unique identifier (UUID). A UUID is a 128-bit number used to identify information in computer systems. The identifier can also transmitted to the plurality of sensors 310, 312, 314. The plurality of sensors 310, 312, 314 are strategically positioned throughout a building housing an elevator system. For example, the plurality of sensors 310, 312, 314 can be positioned along a common path from an entrance of a building to an elevator bank. In one or more embodiments, the plurality of sensors 310, 312, 314 can be positioned in different assigned regions of a building to track when a user device 308 enters and exits a particular region in the building. While the illustrated example depicts only three sensors 310, 312, 314, in one or more embodiments any number of sensors can be utilized.

In one or more embodiments, a user can install an elevator call application (app) on their user device 308. The app can create a unique ID for the particular user device 308 and store this unique ID in the cloud network 320 which can be accessed by the controller 302 and/or the sensors 310, 312, 314. In one or more embodiments, when a passenger enters into a building with their user device 308, the sensors 310, 312, 314 can recognize the device and transmit data to the network 320 and/or controller 302. Based on the passenger’s location in the building, the controller 302 can confirm an elevator car. The user device 308 can receive, through the app in communication with the network 320, the elevator assignment and proceed to the appropriate elevator car 304.

In one or more embodiments, the plurality of sensors 310, 312, 314 determine a location of a passenger based on the location of the passenger’s user device 308. As the user device 308 approaches each of the plurality of sensors 310, 312, 314, the identifier for the user device 308 is compared to the corresponding identifier stored on the plurality of sensors 310, 312, 314. The sensors communicate with the controller 302 to track the passenger as he or she approaches the elevator car 304. The controller 302, using internal logic, can dispatch the elevator car 304 as the passenger approaches to time the arrival of the elevator car 304 with the arrival of the passenger. In one or more embodiments, the sensors 310, 312, 314 can be positioned in different regions of a building. For example, the first sensor 310 can be positioned in a first region at or near an entrance to the building. The second sensor 312 can be positioned near a second region that corresponds to a common path of travel to an elevator bank. And the third sensor 314 can be positioned at a third region that is at or near the elevator car 304. In one or more embodiments, after the eCall is received by the controller 302, the controller 302 can transmit a confirmation to the user device 308. The confirmation can include an elevator car identifier to identify which elevator car the passenger is assigned to. Also, the confirmation can include a time window for the passenger to travel to a certain region or to the elevator car 304 directly. For example, the confirmation can include a statement viewed through the application on the user device 308 stating, "Please travel to the elevator lobby within 30 seconds to avoid cancellation of your elevator car." The sensors 310, 312, 314 can track the user device 308 through the different regions to confirm the passenger is arriving to the elevator car 304 within the time window. In one or more embodiments, the controller 302 can designate a time window for one or more regions in a building. If the user device 308 does not reach a certain region within the designate time window, the controller 302 can cancel the eCall. The controller 302 can also delay the arrival of the elevator car 304 if the user device 308 does not arrive in certain regions within the designated time windows. For example, a passenger may not be able to travel to a region in the time window because of a disability or other reason. The controller 302 can track the user device 308 location through the sensors and adjust the time windows for the passenger as well as adjust the arrival time of the elevator car 304.

In one or more embodiments, the sensors 310, 312, and 314 can be Bluetooth® beacons. Bluetooth® beacons are hardware transmitters—a class of Bluetooth® low energy (LE) devices that broadcast their identifier to nearby portable electronic devices. Smartphones, tablets and other devices can perform actions when in close proximity to a beacon. These beacons use low energy proximity sensing to transmit a universally unique identifier (UUID) picked up by a compatible app or operating system. The identifier and several bytes sent with it can be used to determine the device's physical location, track customers, or trigger a location-based action on the device such as a push notification.

In one or more embodiments, the controller 302 can be an elevator controller that operates and controls elevator cars in an elevator system. In another embodiment, the controller 302 can be a controller that can communicate with an elevator controller. The controller 302 can track a user device 308 throughout a building and forward an eCall request to an elevator controller when the controller 302 confirms a passenger is arriving at an elevator bank. The tracking and confirmation of the passenger to the elevator bank can include the techniques described above.

In one or more embodiments, a passenger can be tracked in a building through the use of an application on the passenger's user device 308. For example, an e-call mobile application (app) can be downloaded on to the user device 308 and can communicate through a network connection with a cloud server in communication with the elevator controller. The e-call mobile app can utilize a building map of the building housing the elevator system. When an e-call is registered with the cloud server, the passenger's location is updated in the building map utilizing the sensors 310, 312, 314. The system 300 can trigger a call to the elevator controller 302 when a passenger reaches a certain point or region in the building that is near to the elevator lobby. Additionally, the user device 308 can receive through the e-call app an assignment of a particular elevator car 304 from the elevator controller 302 through the network 320. For example, a passenger registers an e-call through a mobile e-call app on his or her user device 308. The sensors 310, 312, 314 determine the passenger's location in the building. The system can then designate a region or location that a passenger has to reach before sending the e-call to the elevator controller 302. The region can be within a certain distance from the elevator lobby or within the elevator lobby itself. Once the e-call is sent to the elevator controller 302, the elevator controller 302 can then send information about the elevator car 304 to the passenger directly and may or may not utilize the sensors 310, 312, 314.

Figure 4:
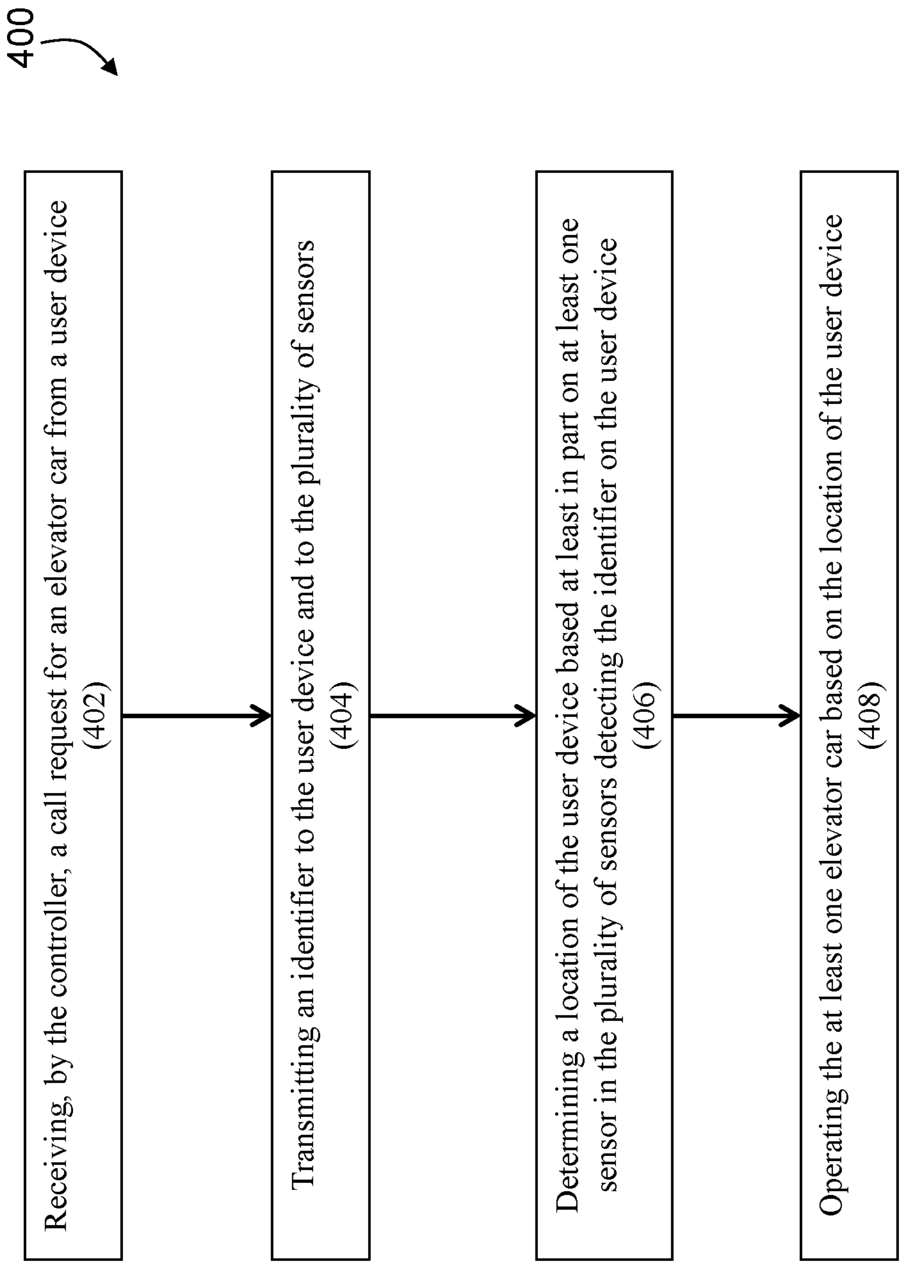
FIG. 4 depicts a flow diagram of a method for registering elevator calls for an elevator system according to one or more embodiments of the disclosure.

FIG. 4 depicts a flow diagram of a method for registering elevator calls for an elevator system according to one or more embodiments. The method 400 includes receiving, by the controller, a call request for an elevator car from a user device, as shown in block 402. The method 400, at block 404, includes transmitting an identifier to the user device and to the plurality of sensors. At block 406, the method 400 includes determining a location of the user device based at least in part on at least one sensor in the plurality of sensors detecting the identifier on the user device. And at block 408, the method 400 includes operating the at least one elevator car based on the location of the user device.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system comprising:

at least one elevator car;

a plurality of sensors;

a controller coupled to a memory, the controller configured to:

receive a call request for an elevator car from a user device;

transmit an identifier to the user device;

determine a location of the user device based at least in part on at least one sensor in the plurality of sensors detecting the identifier on the user device; and operate the at least one elevator car based on the location of the user device;

wherein the controller is further configured to transmit a confirmation to the user device;

wherein the confirmation comprises a time window for a user of the user device to travel to a first region.

2. The elevator system of claim 1, wherein the confirmation comprises an elevator car identifier.

3. The elevator system of claim 1, wherein the controller is further configured to:

cancel the call request based at least in part on the user device failing to travel to the first region within the time window; and transmit a cancellation to the user device.

4. The elevator system of claim 1, wherein the controller is further configured to:

based at least in part on the user device travelling to the first region within the time window, identify a second region for the user device to travel to within a second time window; and determine that the user device travels to the second region within the second time window.

5. The elevator system of claim 4, wherein the controller is further configured to:

cancel the call request based at least in part on the user device failing to travel to the second region within the second time window; and transmit a cancellation to the user device.

6. A system for detecting a location of an elevator passenger, the system comprising:

a plurality of sensors, wherein the plurality of sensors are positioned at one or more locations associated with an elevator system;

a processor coupled to a memory, the processor configured to:

receive a call request for an elevator car from a user device;

transmit an identifier to the user device;

determine a location of the user device based at least in part on at least one sensor in the plurality of sensors detecting the identifier on the user device; and transmit the call request to an elevator controller;

wherein the processor is further configured to transmit a confirmation to the user device;

wherein the confirmation comprises a time window for a user of the user device to travel to a first region.

7. The system of claim 6, wherein the confirmation comprises an elevator car identifier.

8. The system of claim 6, wherein the processor is further configured to:

transmit a cancellation of the call request to the elevator controller based at least in part on the user device failing to travel to the first region within the time window; and transmit a cancellation to the user device.

9. The system of claim 8, wherein the processor is further configured to:

based at least in part on the user device travelling to the first region within the time window, identify a second region for the user device to travel to within a second time window; and determine that the user device travels to the second region within the second time window.

10. The system of claim 9, wherein the processor is further configured to:

transmit a cancellation of the call request to the elevator controller based at least in part on the user device failing to travel to the second region within the second time window; and transmit a cancellation to the user device.

11. A method for registering elevator calls for an elevator system, the elevator system comprising a plurality sensors in communication with a controller, the method comprising:

receiving, by the controller, a call request for an elevator car from a user device, wherein the user device includes an identifier;

determining a location of the user device based at least in part on at least one sensor in the plurality of sensors detecting the identifier on the user device;

operating the at least one elevator car based on the location of the user device;

transmitting, by the controller, a confirmation to the user device;

wherein the confirmation comprises a time window for a user of the user device to travel to a first region.

12. The method of claim 11, wherein the confirmation comprises an elevator car identifier.

13. The method of claim 11 further comprising:

transmitting a cancellation of the call request to the elevator controller based at least in part on the user device failing to travel to the first region within the time window; and transmitting a cancellation to the user device.

* * * * *